Oct. 12, 1948. C. F. REED 2,450,917
APPARATUS FOR STRIPPING PODS FROM MILKWEED PLANTS
Filed July 8, 1944 4 Sheets-Sheet 1

INVENTOR
CORTES F. REED
By Paul, Paul & Moore
ATTORNEYS

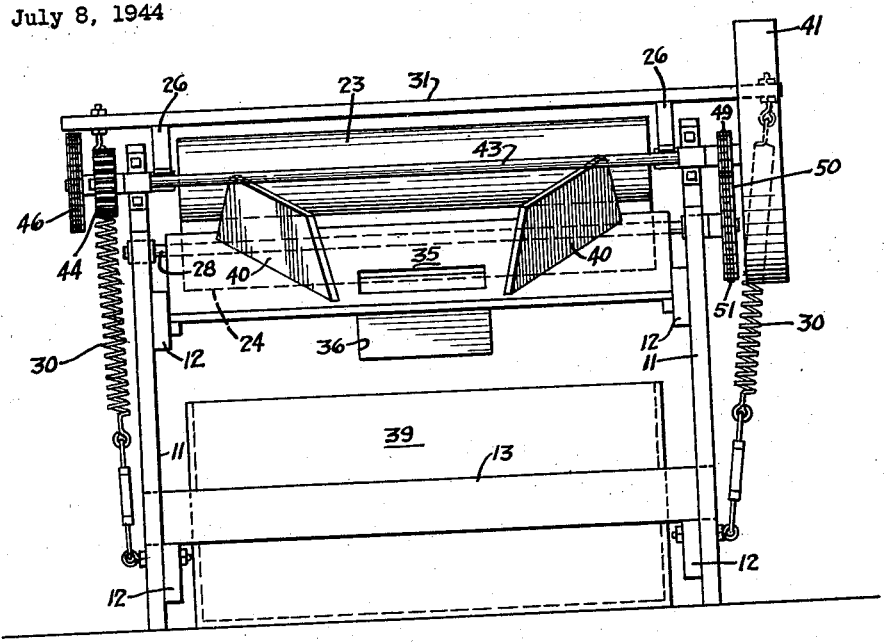
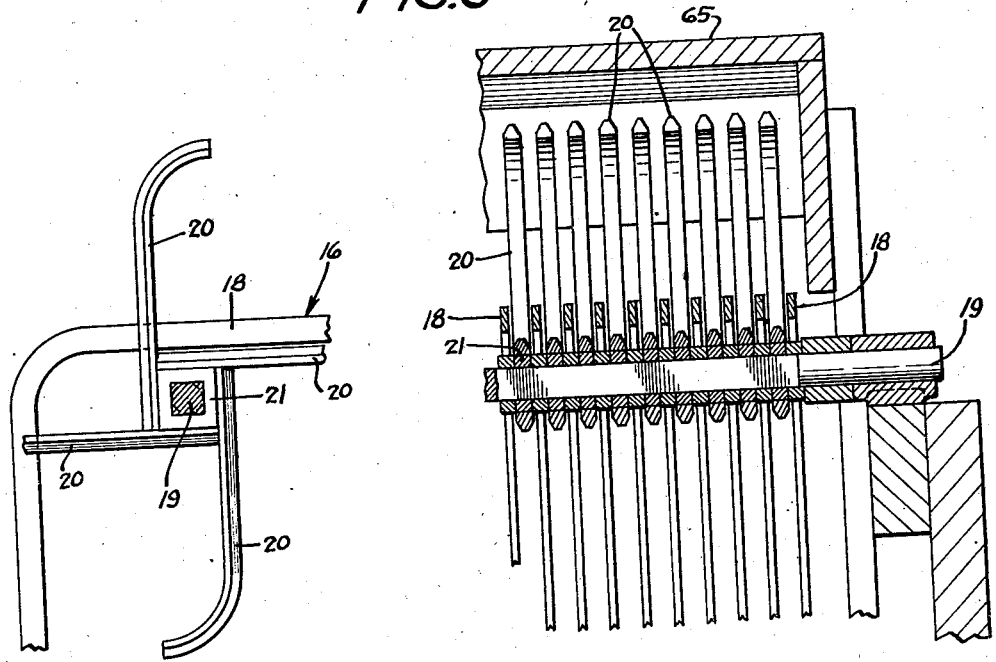

Patented Oct. 12, 1948

2,450,917

UNITED STATES PATENT OFFICE 2,450,917

APPARATUS FOR STRIPPING PODS FROM MILKWEED PLANTS

Cortes F. Reed, Anoka, Minn., assignor to Federal Cartridge Corporation, Minneapolis, Minn., a corporation of Minnesota Application July 8, 1944, Serial No. 544,081

4 Claims. (Cl. 130—30)

This invention relates to a device for stripping pods from milkweed plants.

In recent years efforts have been made to devise useful products from the milkweed. In the utilization of the milkweed, it has been found desirable to separate the plant into its constituent parts and among these operations one of the first is to separate the pod from the main stem of the plant. Heretofore it has not been possible to perform this operation satisfactorily by machine. The present invention makes possible an efficient and simple removal of the pods by means of an apparatus of relatively simple construction.

It is therefore an object of the present invention to provide an apparatus capable of stripping the pods from the milkweed plant. It is another object of the present invention to provide a simple and efficient apparatus capable of separating the pods from the stems of the milkweed plant without undue damage to the respective parts of the plant.

These and other objects of the invention will be more readily apparent from the following description of the invention with reference to the drawings in which Figure 1 is a longitudinal vertical section through the device;

Figure 5 is an end view illustrating the discharge end of the machine;

Figure 6 is an enlarged section taken on the line 6—6 of Figure 3 illustrating the grate and rake mechanism; and Figure 7 is a side view of a detail of the rake and grate mechanism.

Figure 1:
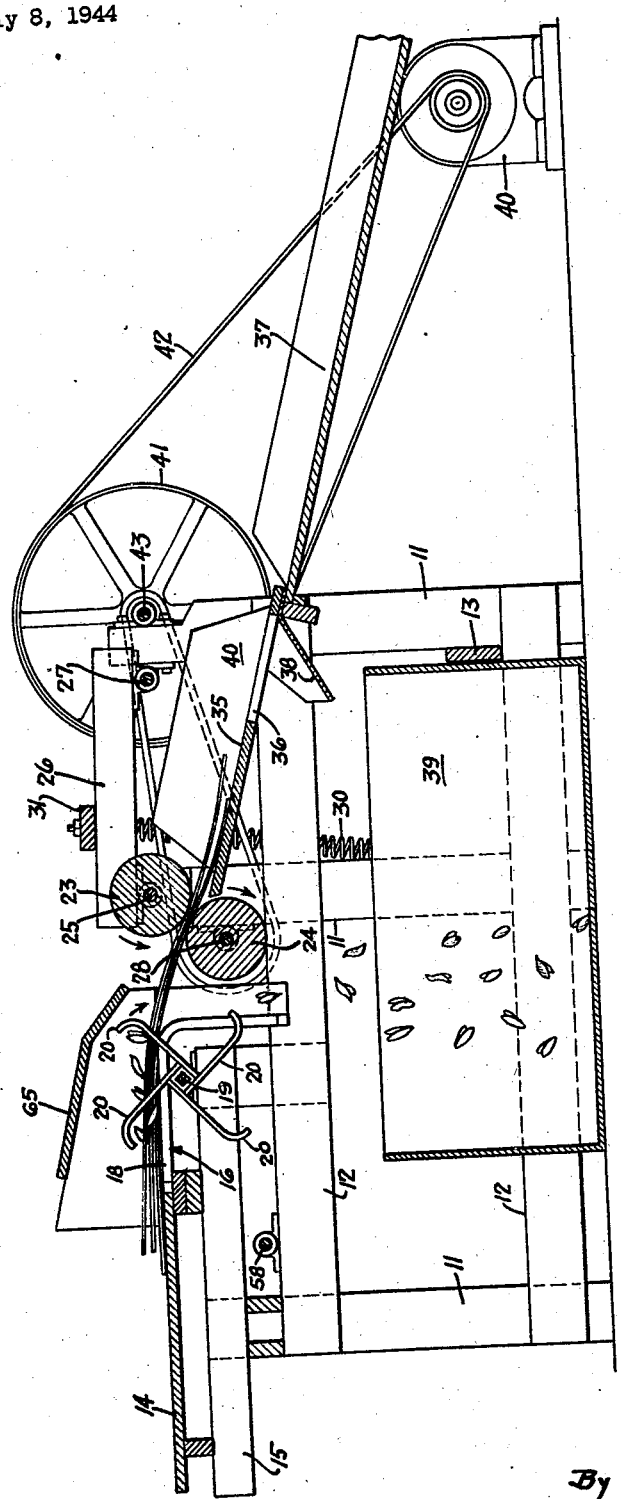
Figure 2:
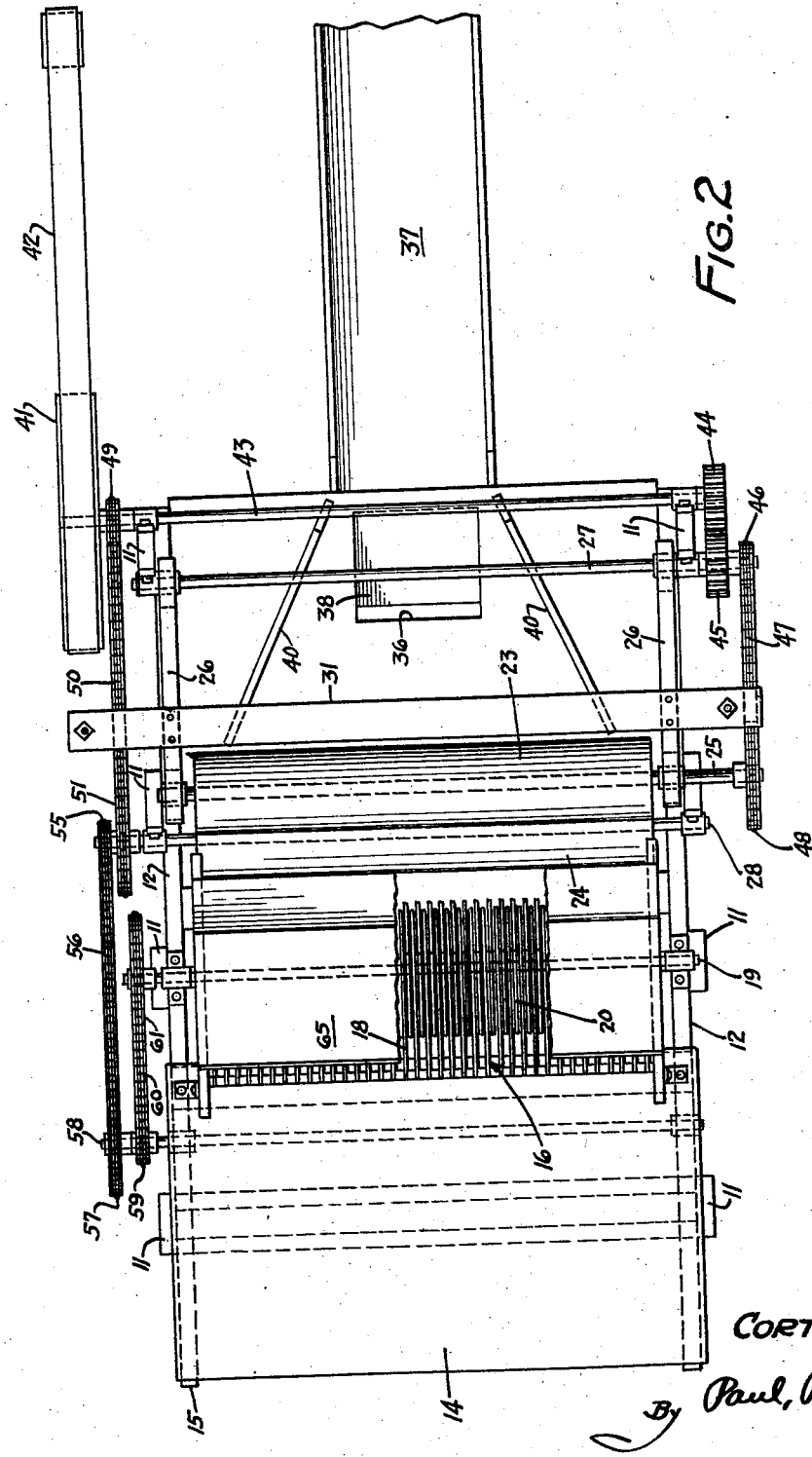
Figure 2 is a plan view of the machine.
Figure 3:
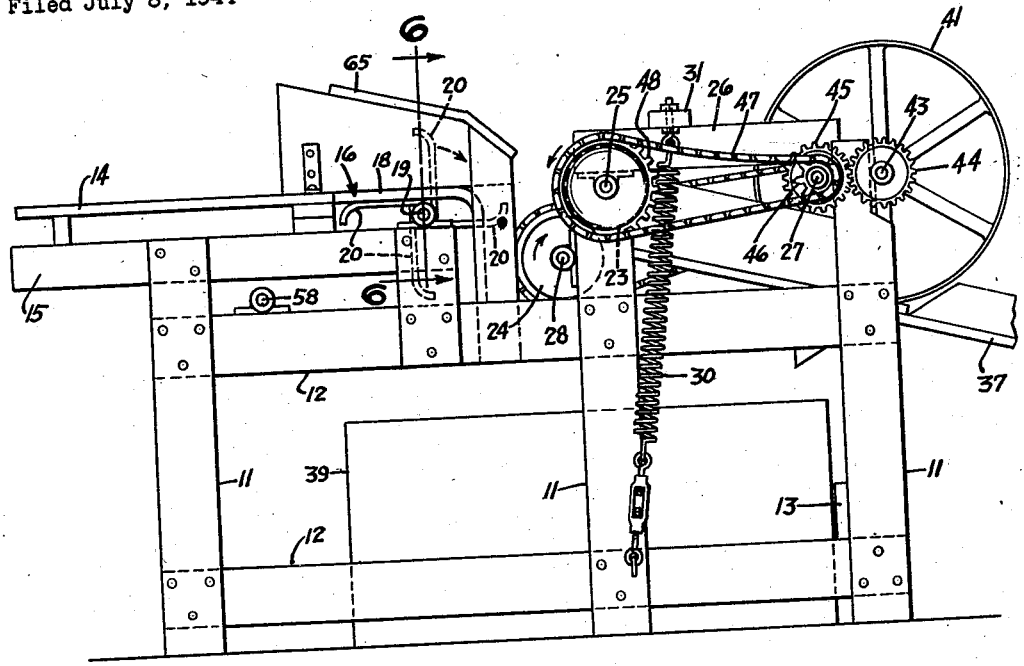
Figure 3 is a side elevation illustrating part of the drive mechanism.
Figure 4:
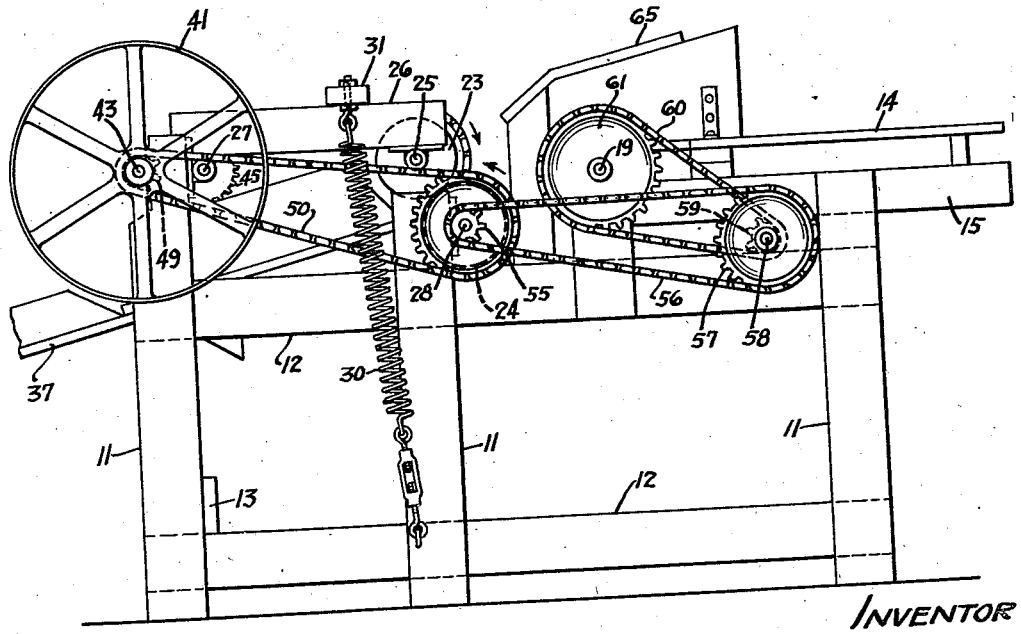
Figure 4 is a side elevation taken from the opposite side of Figure 3.

In general the apparatus is composed of a pair of rollers adapted to pull the milkweed plants through a rake device and thereby strip the pods from the plant. With particular reference to Figures 1–3 and 4, the device is supported on a framework composed of a number of vertical supports 11, connected together near their tops and bottoms with a number of longitudinal members 12 and a number of transverse members 13. A feed table 14, disposed near one end of the machine is supported upon a suitable framework 15, carried by the main frame of the machine. The table 14 terminates in a grate 16, composed of a plurality of spaced bars 18. These bars extend on a horizontal plane for some distance and are then curved downwardly, preferably to assume a vertical plane. Disposed immediately beneath the grate structure and intermediate the ends of the horizontal portion of the grate is a shaft 19, suitably journaled on the framework and carrying a large number of rake elements 20.

With particular reference to Figure 7 these rake elements may be in the form of a number of rake arms extending outwardly from the shaft and curved near their outer end. They may be suitably fastened on a polygonal collar of the same number of sides as the number of arms, such as the square collar 21 shown in the figure. These collars may then be suitably spaced and fastened to the shaft 19. These rakes project between the bars of the grate during part of their rotation and are withdrawn through the grate during another part of their rotation as will appear more fully hereinafter.

The milkweed plants are pulled between these rake elements which are so spaced that the stems of the plants will pass between but the pods will not pass, and accordingly are stripped off. The plants are pulled through the machine by means of a pair of rollers 23 and 24. The periphery of rolls 23 and 24 travel in the same direction at the point of contact. Roll 23 is fixedly mounted on a shaft 25, suitably journaled near one end of a pair of supports 26, the other end of the supports being journaled on a shaft 27, which in turn is supported by the vertical supports 11 near the discharge end of the machine.

The cooperating roll 24 is keyed on shaft 28, which is suitably journaled on vertical supports 11 intermediate the ends of the machine. A pair of springs 30, suitably fastened at their bottoms to the vertical supports and at their tops to a cross member 31, which spans and is fastened to the two members 26, draws the movable roll 23 into contact with the fixed roll 24.

The stems of the milkweed plants after they have been drawn between the rake elements 20, pass between the rolls 23 and 24 and are discharged onto an incline 35, having an opening 36 therein. The opening 36 is sufficiently short in the direction of travel of the material, that the stems of the milkweed plants bridge the opening and pass down to a chute 37, from which they may be taken for further processing. Any pods passing through the rakes 20 but which may be stripped off by the rolls 23 and 24, fall through the opening 36 onto an incline 38 and drop into a bin 39 (or, optionally, a conveyor hopper) disposed beneath the machine and adapted to collect the pods both from incline 38 and those removed by the rakes 20.

The drives for the various parts of the mechanism are obtained as follows: A suitable source of power 40, such as an electric motor, drives a fly wheel 41 through a belt 42. Fly wheel 41 is keyed on a shaft 43, also journaled near the top of the vertical supports 11 near the discharge end of the machine. At one end of the shaft 43 is keyed a gear 44, which drives gear 45, fixedly mounted on shaft 27. A sprocket 46 likewise keyed on shaft 27, drives a chain 47, which in turn drives a sprocket 48 on shaft 25. Near the fly wheel end of shaft 43 a sprocket 49 keyed thereto drives chain 50, which in turn drives sprocket 51 and shaft 28 on which it is keyed. The gear ratios for these respective drives are such that rolls 23 and 24 rotate at the same, or approximately the same, speed.

The rake mechanism is driven from shaft 28 as follows: A sprocket 55, keyed on shaft 28, drives chain 56 and sprocket 57, mounted on the shaft 58. Sprocket 59 likewise keyed on shaft 58, drives a chain 60 and sprocket 61, mounted on shaft 19 which carries the rake elements. A suitable hood 65 may be provided to confine the material in the machine.

The operation of the device is as follows: Milkweed plants (preferably having been cut shortly above the point from which they emerge from the ground) are fed at the entrance end of the machine, stem end first. The stems pass between the rake elements 20 and enter the nip between the rolls 23 and 24. As will be apparent from Figure 4, the rolls 23 and 24 rotate at a much higher speed than does shaft 19 carrying the rake structure, and even though the rake elements 20 move in the same direction as the plant stems passing through the machine, the rolls 23 and 24 pull the plant stems between the rake elements 20 at a faster rate and thereby strip the pods from the plants. The pods drop through the space between grate 16 and roll 24 and into hopper 39. The rakes continue to rotate and any pods that tend to stick between the rake elements are stripped off as the rake elements are withdrawn between the vertical portion of the bars 18.

The stems are pulled through by means of rolls 23 and 24, upper roll 23 yielding sufficiently against spring 30 to accommodate whatever charge may be passed through the machine. The stems discharge from the rolls, pass down the incline 35 and bridge the opening 36, to be discharged into chute 37, from which they may be taken for further processing. The vertical guides 40 force the stems to the center of the machine and in a suitable position to be discharged into the chute 37.

It will be apparent that numerous variations may be made in the machine specifically illustrated in the drawings without departing from the spirit of the invention. It is to be understood therefore that the invention is not limited to the specific device illustrated in the drawings but may be varied within the scope of the following claims.

I claim as my invention:

1. An apparatus for stripping pods from milkweed comprising a grate structure composed of a plurality of spaced bars, a rotatable raking means composed of a plurality of spaced rake elements mounted for rotation on a shaft and extending outwardly therefrom, said rake elements being disposed between said bars and adapted to rotation into and out of engagement therewith, and roll means adapted to draw the plants between the rake elements to strip the pods therefrom, said spaced rake elements being rotatable in the direction of movement of the plants through the apparatus but at a peripheral speed lower than that of said roll means.

2. An apparatus for stripping pods from milkweed comprising a rotatable rake means composed of a plurality of spaced rake elements mounted for rotation on a shaft and yieldable roll means adapted to engage the plants and draw them between the rake elements to strip the pods therefrom, said raking means being rotatable in the direction in which the plants are drawn by the rolls but at a lower peripheral speed than said rolls.

3. An apparatus for stripping pods from milkweed comprising a rotatable raking means comprising a plurality of spaced rake elements mounted for rotation on a shaft and extending outwardly therefrom, the outer ends of the rake elements being curved rearwardly with respect to the direction of the rotation of the shaft, a grate structure composed of a plurality of spaced bars, said bars being bent and having a horizontal portion and a vertical portion, said shaft being disposed beneath the horizontal portion of the bars, said rake elements extending between and above the bars at the horizontal portion and being retractable between the bars at the vertical portion and means for drawing the plants between the rake elements to strip the pods therefrom.

4. An apparatus for stripping pods from milkweed comprising a rotatable raking means, said raking means including a plurality of regular polygonal elements spaced on a shaft and fixed for rotation therewith, a plurality of rake arms, each of said arms being fixed at one end to one face of the polygonal element and extending outwardly therefrom and at the other end being curved rearwardly with respect to the direction of rotation, a plurality of spaced bars interposed between the polygonal elements, said rake arms rotating into and out of engagement with the spaced bars upon rotation of the raking means, and means for drawing the plants between the rake arms to strip the pods therefrom, said rake arms being rotatable in the direction of movement of the plants through the apparatus but at a lower peripheral speed than the speed of the plants.

CORTES F. REED.

REFERENCES CITED

The following references are of record in the file of this patent:

UNITED STATES PATENTS

| Number | Name | Date |
|---|---|---|
| 53,696 | Spencer | Apr. 3, 1866 |
| 428,257 | Stewart | May 20, 1890 |
| 452,442 | Smith | May 19, 1891 |
| 625,846 | Mahon et al. | May 30, 1899 |
| 887,519 | Reed | May 12, 1908 |
| 1,408,896 | Larson | Mar. 7, 1922 |
| 1,424,989 | Covey | Aug. 8, 1922 |
| 1,799,751 | Johnson | Apr. 7, 1931 |
| 1,950,733 | Kopke | Mar. 13, 1934 |